United States Patent [19]
Bertman

[11] 3,994,076
[45] Nov. 30, 1976

[54] MODULAR COMPUTER TEACHING DEVICE

[76] Inventor: Martha O. Bertman, 31 Pleasant St., Potsdam, N.Y. 13676

[22] Filed: Sept. 30, 1975

[21] Appl. No.: 618,011

[52] U.S. Cl. .................................. 35/30; 46/25; 46/43; 273/111; 273/118 D
[51] Int. Cl.² ............................................. G09B 19/02
[58] Field of Search .................. 35/30, 32; 273/111, 273/118 R, 118 A, 118 D; 46/25, 43

[56] References Cited
UNITED STATES PATENTS

| | | | |
|---|---|---|---|
| 555,288 | 2/1896 | Keiser | 273/111 |
| 2,132,757 | 10/1938 | Paulson | 46/25 |
| 3,006,082 | 10/1961 | Libbey | 35/30 |
| 3,331,143 | 7/1967 | Weisbecker | 35/30 |
| 3,390,471 | 7/1968 | Godfrey | 35/30 |
| 3,403,459 | 10/1968 | Divilbiss | 35/30 |

*Primary Examiner*—William H. Grieb
*Attorney, Agent, or Firm*—Charles E. Baxley

[57] ABSTRACT

A cube is provided with four side walls, and an open bottom and top. Mounted within the cube is a flip-flop unit made up of three wings, one wing being longer than the other two so that when a marble is dropped in the cube, the flip-flop unit will rotate until the longer wing is in contact with one of the side walls. A plurality of each such cubes are provided in order to teach adding and subtracting in the binary system and to perform many other functions.

7 Claims, 9 Drawing Figures

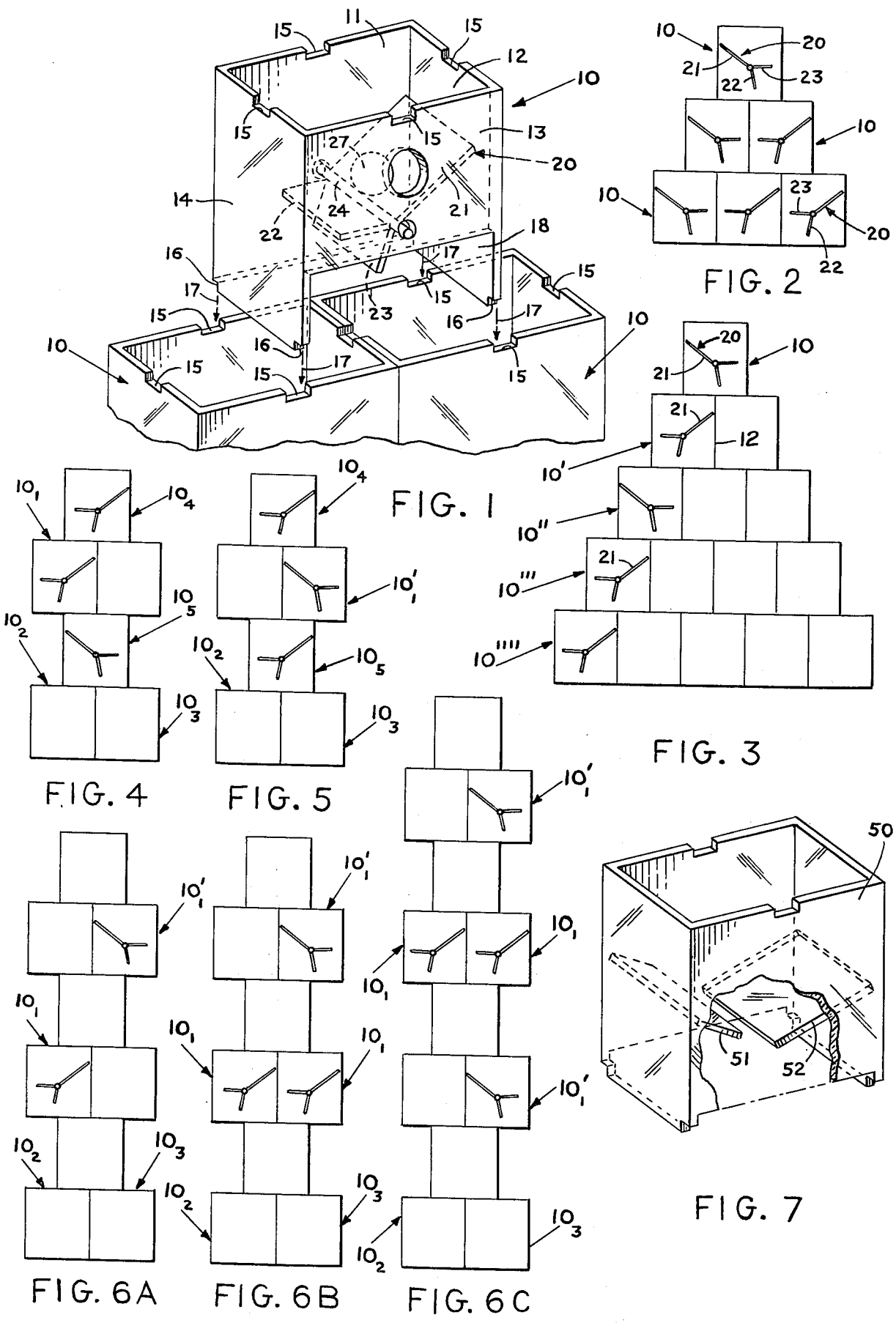

MODULAR COMPUTER TEACHING DEVICE

BACKGROUND OF THE INVENTION

The present invention relates to educational devices that illustrate the basic concepts of computers, and which may add and subtract in the binary system.

Computers are highly sophisticated and complex machines whose basic operational concept is little understood by the average person. Computers use the binary or base-2 number system for calculating, rather than the commonly used decimal or base-10 system. The binary system is extremely useful in computers since any decimal number may be expressed using combinations of only zero or one. For example, the number 26 in the decimal system would be 11010. The leftmost digit in 11010 represents 2 to the power of 4, the second from the left represents 2 to the power of 3, the third from the left represents 2 to the power of 2 and so on. The only difference between the binary system and the decimal system is that in the decimal system the base is 10 rather than 2, so that in a five digit number in the decimal system, the leftmost digit would represent 10 to the power of 4. For example, in the number 40,000, the 4 implies the base 10 raised to the power of 4 times 4.

Since the binary system is able to express any number by using only a 0 or a 1, electronic flip-flop circuits are used in computers to represent these numbers. Flip-flop circuits are merely circuits that have two stable positions. Therefore, one position is indicative of a 1, and the other position is indicative of a 0 when representing numbers in a computer.

In order to teach the concept by which computers operate, it has been known in the art to provide mechanical flip-flops that are capable of being positioned in two stable states. Such mechanical devices utilizing these mechanical flip-flops have been used to illustrate addition and subtraction, as well as in some cases, division and multiplication in the binary system. Such devices not only have the advantage of teaching a student how a computer functions, but also allows him to see how mathematical operations actually work. It stresses an understanding of the mathematical processes utilized, rather than having a student learn by rote the operations required in everyday life.

U.S. Pat. Nos. 3,403,459, 3,006,082 and 3,390,471 all show educational devices that are used to compute in the binary system in order to simulate the operation of a computer. However, all these prior art devices are very costly and exceedingly complex that more often than not cloud the very issue to which they are directed; to wit, the teaching of computing in the binary system. These prior art devices also have the disadvantage of being cumbersome and parochial in their use.

SUMMARY OF THE INVENTION

It is, therefore, the prime object of the present invention to provide a teaching device for computing in the binary system, and which may be used in many numerous ways, limited only by the imagination of the user of the device.

The teaching device of the present invention is made up of a plurality of individual cubes, each cube being mountable on other cubes. Within each cube there is provided a flip-flop which has three wings. The three wings are arranged for rotatable movement in each cube, whereby one wing is of such length as to prevent rotation of the wings by more than the angular distance determined by the path of movement of the larger wing from contact with one wall of the cube to contact with another wall of the cube. Depending on which wall the larger wing abuts, a smaller wing will be exposed to a marble, or the like, falling thereon to thereby rotate the entire wing-unit and cause the larger wing to rotate into abutting relationship with the opposite wall, thereby exposing the other smaller wing. In this manner, two stable states are achieved in the device; one state being indicative of a "1" in the binary system, and the other state being indicative of a "0".

Each cube thus provided with the three rotatable wings may be combined or stacked in any manner to illustrate mathematical operations, may be combined for amusement to see how the marbles will fall, and also may be combined to invent a new game played according to any desired rules.

BRIEF DESCRIPTION OF THE DRAWING

The invention will be more readily understood by the following detailed description when taken in conjunction with the accompanying drawings in which:

FIG. 1 is a perspective view showing the cube of the present invention;

FIG. 2 is a schematic view showing the cube of the present invention stacked in the form of a teaching device;

FIG. 3 is a schematic view showing the cubes of the present invention in another stacked arrangement for adding numbers in the binary system;

FIG. 4 is a schematic view showing the cubes of the present invention in still another stacked arrangement in which the concept of "Either A or B" is demonstrable;

FIG. 5 is a schematic view showing the cubes of the present invention in still another stacked arrangement in which the concept of "Both A and B" is demonstrable;

FIGS. 6A, 6B and 6C are schematic views showing a combination of the concepts of FIGS. 4 and 5; and FIG. 7 is a perspective view showing the director cube of the present invention.

DETAILED DESCRIPTION OF THE INVENTION

Referring now to the drawings, and specifically to FIG. 1 there is shown a cube 10 of the present invention. The cube 10 consists of 4 side walls 11, 12, 13, 14 which are not connected at the top and bottoms thereof in order to form a hollow throughout the length of the cube. Each top edge of the side walls 11, 12, 13, 14 has a groove 15 formed midway of the length of the top edge. The four side walls 11, 12, 13, 14 form at their bottoms four corners. In these corners are formed cut-outs 16 which are received in groove 15 of another cube 10 mounted therebelow. Each cut-out 16 has a top horizontal surface which rests on the surface of a groove 15, and a downwardly extending, vertical surface which abuts against the interior surface of a side wall just beneath the groove 15, so that the cut-outs seat in the grooves as is indicated by arrows 17. It can be seen from FIG. 1 that the cubes are stacked so that one cube is supported by two cubes therebelow, or may alternately be supported by only one cube, the fit between the grooves 15 and the cut-outs 16 being tight enough so as to allow for the support of the cube 10 by only one other cube.

The cube of the present invention is advantageously dimensioned so that the length of each side wall 11, 12, 13, 14 from the top edge to the top surface of the cut-out 16 is about 6.3 cm., the lengths of the horizontal and vertical surfaces of the cut-out 16 are 0.3 cm., the width of each side wall is 6 cm., and the length, width, and depth of each groove 15 is 0.6 cm., 0.3 cm., and 0.3 cm., respectively.

Rotatably mounted within each cube 10 is a flip-flop unit 20. The flip-flop 20 has three wings 21, 22, 23, rotatably mounted between the side walls 11 and 13, the wall having an open portion 18 to allow access to the flip-flop unit. A spindle or shaft 24 is mounted in the side walls 11 and 13 for rotatable movement in any conventional manner. The wings 22 and 23 are both of equal length, while the wing 21 is about 2 times longer than the wings 22, 23. The wing 21, because of its greater length, can only rotate from contact with the side wall 12 to contact with the side wall 14, thereby limiting the rotation of the entire flip-flop 20. As can be seen in FIG. 1, when the wing 21 is in abutting contact with the side wall 12, the wing 22 is exposed to the top opening of the cube so that when a marble 27, or the like, is dropped into the cube, it will roll down the wing 21 onto the wing 22 and thereby, under gravity, rotate the entire unit until the wing 21 is in an abutting contact with wall 14. In this position, the wing 23 will be exposed to the top opening of the cube 10. The wing 21 is of such length that when it is in contact with one of the side walls 12, 14, its center of gravity will be so positioned as to prevent the rotation of the flip-flop back to starting position. That is, the moment caused by the center of gravity of the wing 21 about the shaft 24 is greater than the combined moments of the centers of gravity of the other wings 22, 23. Only when a marble, or the like, is inserted into the cube will the combined moments of the wings 22, 23 be enough to overcome the moment of the center of gravity of the wing 21 to thereby rotate the flip-flop unit.

The wing 21 is advantageously dimensioned so as to have a length, as measured along the length of the shaft, of about 5 cm. while its width, as measured from the shaft to the top edge in contact with one of the walls 13, 14, of about 3 cm. The wings 22, 23 each has a length of about 1.7 cm. and a width of about 5 cm.

It, therefore, can be understood that the flip-flop unit 20 of the present invention has two stable positions, the first when the wing 21 is in contact with the side wall 12, and the wing 22 is exposed to a falling marble, and a second when the wing 21 is in contact with the side wall 14 and when the wing 23 is exposed to a falling marble.

In using the cubes of the present invention, a number of different teaching uses may be derived by stacking the cubes in different arrangements. In FIG. 2, a pyramidal type arrangement is shown where a student or child may drop a marble into the top cube 10, and watch the flip-flop units flip as the marble drops down from one cube to another. By the initial positioning of the flip-flop units 20 in each cube 10, a desired path of travel of the marble may be attained, thereby making the child use reasoning to attain the desired path.

In FIG. 3, a pyramidal type arrangement is again shown. However, in this arrangement, the stack of cubes may be used to add numbers. Since by designating one position of the flip-flop unit as indicating a 0, and the other position as a 1, addition of binary numbers may be achieved. For example, the cube $10'$ of FIG. 3 has its flip-flop unit in a first state where the wing 21 is in contact with the side wall 12. This position of the flip-flop unit is indicative of a 1, while the other position is indicative of a 0. The five cubes that form the left diagonal portion of the arrangement indicate a binary number of 11010, which in the decimal system is equivalent to 26. The cube $10''''$ represents in the binary system 2 raised to the fourth power, while cubes $10'''$, $10''$, $10'$, represent 2 raised to the third, second and first power, respectively. The cube 10 represents the unit column. In order to use the arrangement of FIG. 3 for adding, the number that is to be added to the number already represented by the arrangement is simply fed in by dropping marbles in those cubes that will represent the number. For example, if 3 were to be added to the number 26, or in the binary system, i.e., if 11 were added to 11010, a first marble would be dropped down the cube $10'$, and a second marble down the cube 10, thereby giving a reading of 11101, or 29 in the decimal system. Many numbers may be added to the arrangement of FIG. 3 as long as the total does not exceed 32 since there is provided only a power of 2 to the fourth power. However, it is quite easy to extend the arrangement of FIG. 3 to add numbers whose total exceeds 32 as long as additional cubes are provided.

The cubes in FIG. 3 that are not shown as containing any flip-flop units need not contain any of these units since all the adding is achieved by the diagonal cubes $10$—$10''''$. Therefore, the flip-flop units may be left out of these cubes if desired.

The arrangement of FIG. 3 may be used to subtract numbers. In this operation, the right diagonal cubes would be used instead of the left diagonal. The principal of operation, however, is similar.

FIGS. 4 and 5 show a different use of the present invention. In FIG. 4 the cubes are arranged in A-or-B stack. This is used for showing theorems relating to sets or subsets. The cube $10_1$ is referred to as the "OR" cube, $10_2$ the true cube, $10_3$ the false cube, $10_4$ the statement A cube, and $10_5$ the statement B cube.

The arrangement of FIG. 4 may be used in the following way: In set theory, the phrase "either statement A or statement B is true" means that if either of the statements A or B is true, then both statements are true. In FIG. 4, if the positions of the flip-flop unit when in the first state, as was indicated in FIG. 3 is made to represent true, the second position false, then, as can be seen in FIG. 4, by placing the cube $10_1$ as shown with its flip-flop unit in the true position, if either statement A or B is true, as represented by cube $10_4$ and $10_5$ respectively, then the marble will fall into the cube $10_2$ indicating true.

The arrangement of FIG. 5 is similar to that of FIG. 4, but with the cube $10_1$ replaced by the AND cube $10'_1$. This arrangement will indicate whether both statements A and B are true. That is, both statements A and B must be true for the both A and B to be true. The cube $10'_1$ is positioned so that its flip-flop unit is in the second, false position so that when either of the cubes $10_4$ or $10_5$ are false, the marble will fall to the cube $10_3$. It is noted that the cubes $10_2$ and $10_3$ may or may not have flip-flop units therein, but may be simply labelled TRUE or FALSE, respectively.

FIGS. 6A, 6B and 6C show different combinations of cubes where the "AND" and "OR" cubes are combined in one arrangement to perform combinations of AND/OR operations.

The cubes of the present invention may perform many other functions for teaching and for amusement. For example, tic-tac-toe may be played with an arrangement of the cubes, where the player is playing against the device. Such an arrangement would have programmed sequence of cubes indicating a circle or a cross in a particular square. One of the reasons the flip-flops assume a horizontal position is so that packets containing written messages can be placed on them (wing 22 of FIG. 1). When the marble passes through a cube with a message, the packet is expelled with the marble.

The cube of the present invention may be made half its width in order to support an arrangement of cubes. Such a half-width cube would be used to support the arrangement of cubes at the bottom thereof.

While specific embodiments of the present invention have been disclosed, it is to be understood that numerous changes and modifications may be made without departing from the spirit and scope of the invention. For example, the "AND" and "OR" cubes were shown as having the same flip-flop units as the other cubes. However, these cubes could have a director cube 50 shown in FIG. 7 where a pan of slides 51 and 52 direct the marble into the approximate cube $10_2$ or $10_3$.

I claim:

1. A teaching device comprising at least one cube having four side walls, an open bottom and an open top, each of said four side walls having a top edge and a groove formed in said top edge, said four side walls forming at the bottom thereof four corners, each of said four corners having a cut-out formed therein, so that said cube may be mounted on another cube of like configuration, and a flip-flop unit mounted between two of said side walls for rotation in said cube, said flip-flop unit comprising a shaft rotably mounted between said two side walls, a first wing extending from said shaft, and a second and third wing spaced angularly from said first wing about said shaft, and said first wing having a length greater than the lengths of said second and third wings, whereby when a marble or the like is dropped into said open top of said cube, said flip-flop unit is rotated until said first wing contacts one of the other two side walls.

2. The teaching device according to claim 1 wherein said flip-flop unit is positionable in a first and second state, said first state comprising said first wing in contact with one of said other two side walls, and said second state conprising said first wing in contact with the other of said other two side walls.

3. The teaching device according to claim 1 comprising a plurality of said cubes, said plurality of cubes being arranged in a pyramid.

4. The teaching device according to claim 3 wherein said pyramid comprises a diagonal row of said cubes, and said flip-flop unit is positionable in a first and second state, said first wing in contact with the other of said other two side walls, the cubes in said diagonal row having respective flip-flop units arranged in either of said first or second states to thereby represent a number in the binary system.

5. The teaching device according to claim 1 comprising a plurality of said cubes.

6. The teaching device according to claim 5 wherein said plurality of cubes are stacked into an arrangement, said arrangement comprising alternating rows of single and double cubes.

7. The teaching device according to claim 6 wherein said plurality of cubes are arranged so that one cube is supported by two other cubes, said cut-outs in said one cube being supported by said grooves in said other two cubes.

* * * * *